United States Patent [19]

Ringer

[11] 4,093,084

[45] June 6, 1978

[54] FREIGHT-TRANSPORTATION SYSTEM WITH ROAD/RAIL TRANSSHIPMENT

[76] Inventor: Karl Ringer, Frauenbergstrasse 30, Bad Waldsee, Germany, D-7967

[21] Appl. No.: 607,509

[22] Filed: Aug. 25, 1975

[30] Foreign Application Priority Data

Aug. 24, 1974 Germany .............................. 2440682

[51] Int. Cl.² ........................................... B65G 43/00
[52] U.S. Cl. .................... 214/11 R; 104/88; 198/365; 214/38 BB; 214/38 D; 340/153
[58] Field of Search .......... 214/11 R, 16.4 B, 16.4 A, 214/38 BB, 38 CA, 38 D, 43; 104/88; 246/5; 198/183, 365; 186/1 C; 340/153, 172.5

[56] References Cited

U.S. PATENT DOCUMENTS

| | | | |
|---|---|---|---|
| 1,718,737 | 6/1929 | Freilino | 198/183 |
| 2,883,106 | 4/1959 | Cornwell et al. | 340/153 |
| 3,483,829 | 12/1969 | Barry | 104/88 |
| 3,550,748 | 12/1970 | Hauer | 198/183 |
| 3,550,756 | 12/1970 | Kornylak | 198/183 |
| 3,568,822 | 3/1971 | Conkey et al. | 198/183 |
| 3,613,910 | 10/1971 | Weir | 214/38 D |
| 3,799,365 | 3/1974 | Sullivan et al. | 214/11 R |
| 3,803,556 | 4/1974 | Duffy | 214/11 R |
| 3,891,100 | 6/1975 | Tamaki et al. | 214/38 CA |
| 3,892,372 | 7/1975 | Hauber | 104/88 |
| 3,921,828 | 11/1975 | Suizu | 214/16.4 A |

FOREIGN PATENT DOCUMENTS

| | | | |
|---|---|---|---|
| 254,046 | 10/1962 | Australia | 198/183 |
| 424,632 | 5/1967 | Switzerland | 214/38 CA |

OTHER PUBLICATIONS

"Automated Freight Handling Systems", General Electric, Dec. 9, 1963.

Primary Examiner—Trygve M. Blix
Assistant Examiner—Edward R. Kazenske
Attorney, Agent, or Firm—Montague & Ross

[57] ABSTRACT

A rail network serving a given territory has a multiplicity of transfer stations for the transshipment of freight containers between local truck routes and scheduled freight trains, as well as between trains traveling to different destinations, each train comprising a number of flatcars with transverse roller conveyors which are aligned with similar conveyors on adjoining platforms when the train halts at a station. The platforms are separated by one or more railroad tracks and by several longitudinal conveyors in the form of articulated chains whose links are also provided with transverse roller conveyors alignable with those of the platforms and the flatcars. Transversely shiftable platform sections, each of a length equaling that of the flatcars, can be advanced into contact with a standing train to complete a driving circuit for the flatcar-mounted conveyors whereby containers resting on the rollers of a platform section can be moved onto the flatcar or vice versa. The platform sections can also be shifted completely across the well of a track, in the absence of a train, to enable the movement of a container to the opposite side. The conveyors and platform shifters are all controlled by a local computer, communicating with computers of nearby stations, on the basis of available-space information from preceding computers and of destination data fed in by local shippers or by the computers of originating stations.

26 Claims, 10 Drawing Figures

FREIGHT-TRANSPORTATION SYSTEM WITH ROAD/RAIL TRANSSHIPMENT

FIELD OF THE INVENTION

My present invention relates to a freight-transportation system in which standard-size containers are to be transshipped between road vehicles such as trailers or trucks, used for local transport, and railroad flatcars serving for the long haul.

BACKGROUND OF THE INVENTION

It has already been proposed (see German published specification No. 2,231,442) to provide transfer stations at road/rail junction points in which self-propelled carriages, movable in two orthogonal directions, serve for the transport of loads in a longitudinal or Y direction (parallel to a set of tracks) and in a transverse of X direction between road and rail vehicles. A hitherto unsolved problem in such a system is the control of traffic at the intersections of the longitudinal and transverse carriage paths.

OBJECTS OF THE INVENTION

An important object of my present invention, therefore, is to provide improved intra-station transport facilities in such a system for minimizing the time required to unload containers or similar loads from trucks onto waiting flatcars and vice versa.

Another object is to provide means in such a system for pre-establishing the path to be taken from a delivery vehicle to a departing flatcar or from an arriving flatcar to a pick-up vehicle, via an interim-storage facility if necessary, on the basis of information available from a local shipper and other stations so as to expedite the transfer of all the loads to and from any train halting at a given station.

A further object of my invention is to reduce pollution in the environment of a railroad station as well as the consumption of fuel such as diesel oil by eliminating the switching operations taking place in the freight yards of conventional railroad systems.

A related object is to improve fuel economy by making freight trains more efficient in serving a given territory.

SUMMARY OF THE INVENTION

I realize these objects, in accordance with the present invention, by providing each transfer station of a freight-transportation system with a computer controlling the operation of conveyor means at the station, in response to destination and available-space information fed in, for transferring modular loads between flatcars of a train halting at the station and loading and unloading bays designed to accommodate road vehicles (referred to hereinafter as trucks) adapted to carry such modular loads of predetermined dimensions. The term "modular loads" embraces standard-size containers as well as other cargo with or without supporting pallets of prescribed size; for convenience I shall refer hereinafter only to containers.

The destination information ca some from a local shipper, if the rail transport starts at the station here considered, or from another station if a container identified by a suitable code is carried by an arriving flatcar and is to be picked up by a truck or is to be loaded onto another freight train halting or expected at the considered station. Moreover, the local computer should also be informed what unit areas of modular-load size are vacant on a train arriving or due to arrive at the station. Thus, the computers of adjacent stations in my improved transportation system are interconnected to exchange the necessary information.

Pursuant to a more particular feature of my invention, each station computer includes a routing memory for the storage of such pseudo-invariant data as train schedules and station codes, the latter being advantageously listed in alphabetic directories available to shippers or freight forwarders who can feed the proper destination and container-identification codes to the local computer via data carriers such as punch cards suitable for electronic processing. The routing memory so addressed preselects a train traveling toward the desired destination; from a communicating computer, associated with a station upstream along the route of the preselected train, a space allocator in the local computer learns what unit areas are free on that train and assigns one of them, according to any suitable preference system, to the container in question. With this assignment the computer marks an unloading bay from which a straight-line transfer path extends to the chosen unit area once the train has pulled into the station and has come to a halt in a predetermined position on its track, the transfer path being transverse to that track. A location code identifying the marked unloading bay can thus be read out to the shipper, or to the driver of a delivery truck carrying the container to the station, in order that the truck may proceed to the assigned unloading bay without necessarily awaiting the arrival of the train. In an analogous manner, the designated recipient of a container about to arrive at the station may be informed in advance by the station personnel, usually by telephone, of the identity of an assigned loading bay to which a pick-up truck can then proceed even before the train comes in. The computer may also ascertain, through an exchange of verification signals with each activated loading and/or unloading bay, whether a truck is properly positioned thereat and its driver is entitled to load or unload a container to which space has been allocated on a train; in the case of a loading bay, for example, such authorization may be contingent upon the payment of a charge for transportation and/or interim storage unless such payment has already been made at the point of dispatch.

In accordance with another important feature of my invention, each of the transfer paths extending between the several bays and the track or tracks comprises a set of feed rollers arrayed in one or preferably two rows, these rollers being displaceable by computer-controlled drive means to advance a load resting thereon. The rollers of each transfer path may form a series of cascaded transverse conveyors disposed in part on platforms flanking the track or tracks and in part on longitudinal conveyors interposed between such platforms. Thus, each longitudinal conveyor may comprise an endless chain with articulated links each of such length as to span a whole number of roller rows and a width accommodating at least one container, some feed rollers being disposed on each of these links to constitute all or part of a transverse conveyor aligned with corresponding conveyors on the adjoining platform when the longitudinal conveyor is at standstill. Such transverse roller conveyors may also be provided on the flatcars themselves, to help in the positioning of the containers aboard the train and in their discharge from the train at the proper station; these latter conveyors may be provided with preferably pneumatic locks or brakes controlled automatically or manually, e.g. by the locomotive engineer, to immobilize the containers during rail transportation.

Advantageously, the platforms proximal to a track are longitudinally subdivided into sections which have substantially the length of a flatcar and are individually shiftable, preparatorily to the transfer of a container to or from the train, toward a stationary flatcar aligned therewith so as to reduce or eliminate the intervening gap. This shift, which may be commanded by the computer in response to a signal from the engineer, can also be used to complete a drive circuit for the flatcar conveyors from the control unit of the computer. A similar but larger shift may take place in the absence of a train to let a platform section bridge the well of an idle track in order to advance a container onto the other side thereof, e.g. for allowing it to reach another track or a longitudinal conveyor. The longitudinal conveyors may be used for removing a container, discharged from a preceding train, to another trackside location for loading onto another train on the same or a different track, or for carrying a container to an intertim-storage area if a recipient is not at the station in order to pick it up.

BRIEF DESCRIPTION OF THE DRAWING

The above and other features of my invention will now be described in detail with reference to the accompanying drawing in which.

SPECIFIC DESCRIPTION

Figure 1:
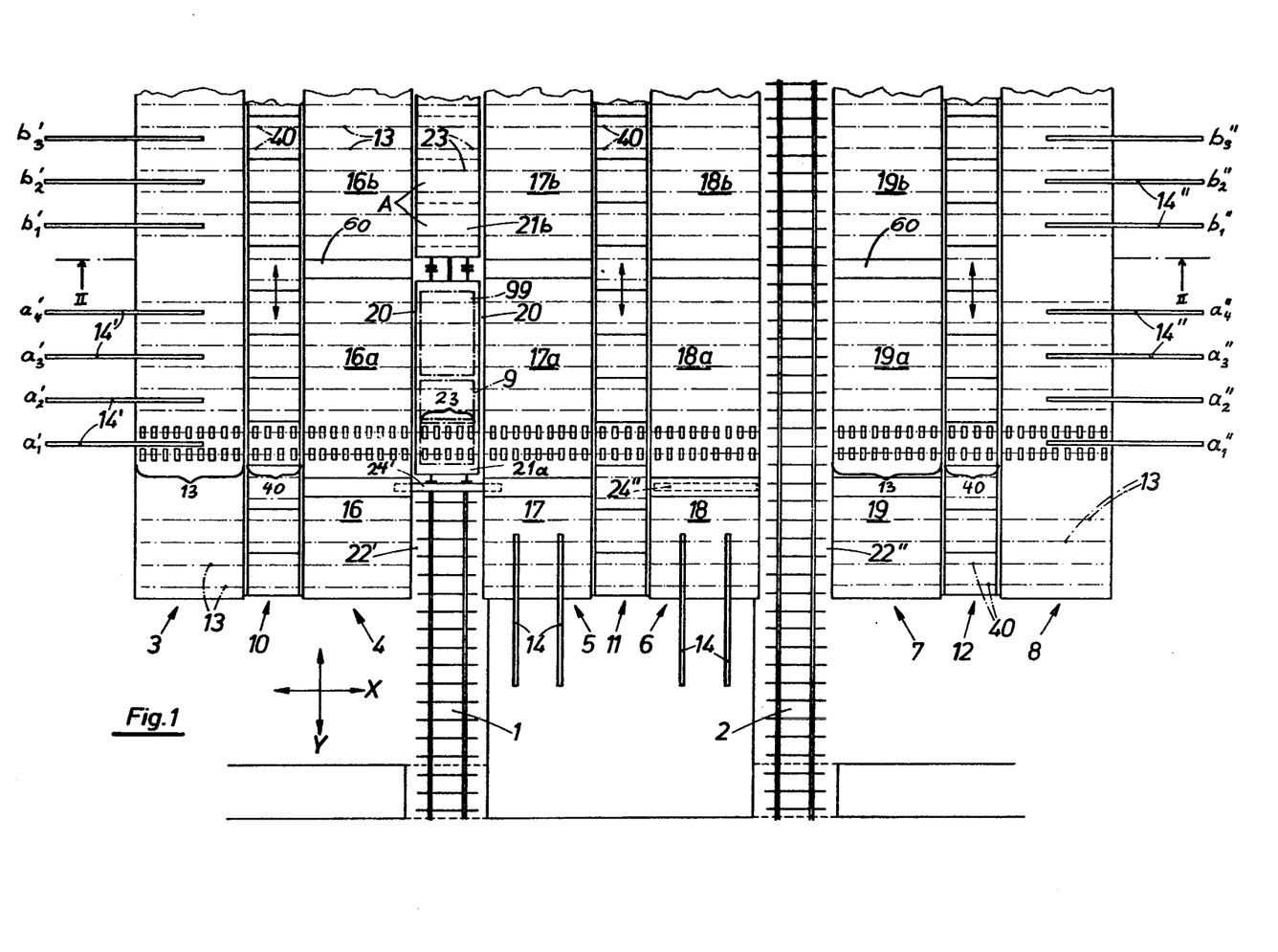
FIG. 1 is a diagrammatic plan view of a transfer station in a freight-transportation system embodying my invention.

FIG. 1 shows one of a multiplicity of transfer stations, linked by a common rail network, which is provided with two parallel railroad tracks 1 and 2 extending in a longitudinal direction Y. Three longitudinal conveyors, i.e. an outer conveyor 10 to the left of the tracks, a middle conveyor 11 between the tracks and an outer conveyor 12 to the right thereof, are flanked by respective pairs of platforms 3-4, 5-6 and 7-8. The platforms 4-7, adjoining the tracks, are longitudinally divided into a number of sections of which only three are visible in each instance, i.e. sections 16, 16a, 16b of platform 4, sections 17, 17a, 17b of platform 5, sections 18, 18a, 18b of platform 6 and sections 19, 19a, 19b of platform 7. Except for the terminal section 16–19, which serve as interim-storage areas, each of these sections has the length of a railroad flatcar 21 (FIG. 2); two such flatcars 21a and 21b, forming part of a freight train on track 1, are shown aligned with sections 16a–19a and 16b–19b, respectively.

The outer platforms 3 and 8 adjoin two series of truck bays aligned in groups of four with each set of main platform sections 16a–19a, 16b–19b etc., only the bays $a'_1-a'_4$, $a''_1-a''_4$ of the first group and three bays $b'_1-b'_3$, $b''_1-b''_3$ of the second group being shown on each side of the station. It will be assumed that the left-hand bays $a''_1$ etc. serve for the unloading of outgoing containers 9 from delivery trucks while the right-hand bays $a''_1$ etc. serve for the loading of incoming containers onto pick-up trucks. These bays are equipped with respective overhead transporters 14' and 14".

A multiplicity of transport paths transverse to tracks 1, 2 extend in a direction X to the left of track 1 across platforms 3, 4 and the intervening conveyor 10, between tracks 1 and 2 across platforms 5, 6 and the intervening conveyor 11, and to the right of track 2 across platforms 7, 8 and the intervening conveyor 12. These paths are constituted by transverse conveyors 13 on the platforms 3 - 8 and similar cross-conveyors 40 on the longitudinal conveyors 10 - 12, each of these transverse conveyors consisting of a pair of adjacent rows of feed rollers 25 (FIGS. 3 - 8). The rows of rollers 25 are equispaced on the several sections 16 - 16b of platforms 4 - 7 and also on the undivided outer platforms 3 and 8 except for zones in line with parting walls 60 which separate the sections of each divided platform from one another Further cross-conveyors 23 are provided on flatcars 21a, 21b etc. of the train occupying the track 1 and, in the illustrated halting position of that train, are precisely aligned with respective conveyors 13 and 40. In FIG. 1 I have shown only two rows of rollers forming part of one series of cascaded transverse conveyors 13, 40, 23, specifically those in line with bays $a'_1$ and $a''_1$; the others have merely been indicated by dot-dash lines.

Each flatcar is divided into a certain number of unit areas A (here four) associated with respective loading and unloading bays and served by the corresponding cross-conveyors 13, 40. Naturally, the linking cross-conveyors 40 can be used only when the corresponding longitudinal conveyors are at standstill. At such times there exists, accordingly, a mechanism for transferring a container from any unloading bay to a location adjacent a respective unit area of a train halted on track 1, from a location adjacent any unit area of a train halted on track 2 to a respective loading bay, and between corresponding locations adjacent these two tracks.

The several sections of platforms 4 - 7 are transversely shiftable toward the adjoining tracks to eliminate the gaps 20 existing between them and a halted train. If no train is on the track, they can be shifted further so as to bridge the entire depressed track bed or well 22' or 22" whereby containers from the unloading bays at left can be moved onto conveyor 11 or platform 6, for example, whereas containers from train 21a, 21b etc. can be placed on conveyor 12 or delivered to the loading bays at right. It is thus possible to feed an outgoing container, delivered at any unloading bay, to a flatcar on either track and conversely to direct an incoming container from a flatcar on one or the other track to a waiting pick-up track. Containers prematurely delivered or belatedly picked up may be temporarily stored on the cross-conveyors 13 of platform sections 16 - 19 and corresponding portions of platforms 3 and 8 to which access can be had via further overhead transporters 14 overhanging sections 17 and 18; in order to discourage premature deliveries or delayed pick-ups, a separate charge may be levied for such interim storage. These storage areas may also be used for containers taken off a train for transfer to another train due to arrive at a later time. The width of each platform is seen to equal about twice that of a track and of a longitudinal conveyor, thus greatly exceeding the length of a container 9.

Since the cars of a moving train must not be rigidly coupled to one another, it behooves to establish definite positions of alignment for all the flatcars of a train halted in the station. To this end I provide bumper blocks 24', 24" that are normally retracted laterally into parting walls 60 of platforms 5 and 6 from which they can be moved across the respective track 1, 2 behind the last car of a train that has just pulled into the station and stopped at a signal light. With block 24' thus positioned athwart track 1, the train can be backed up slowly to let the last flatcar 21a contact it with its buffers and to close up the spaces between the buffers of the other flatcars. (Alternatively, the last flatcar 21a could be anchored to the block by inextensible hooks and the cars could then be pulled apart to the limits allowed by their connecting linkages.) It is only then that their unit areas A are aligned with the cross-conveyors of the platforms as described above.

The loading and unloading of trucks by the overhead transporters, the driving of the longitudinal and transverse conveyors, and the shifting of the platform sections are all controlled by a local computer 100, FIG. 9, as more fully described hereinafter.

Figure 2:
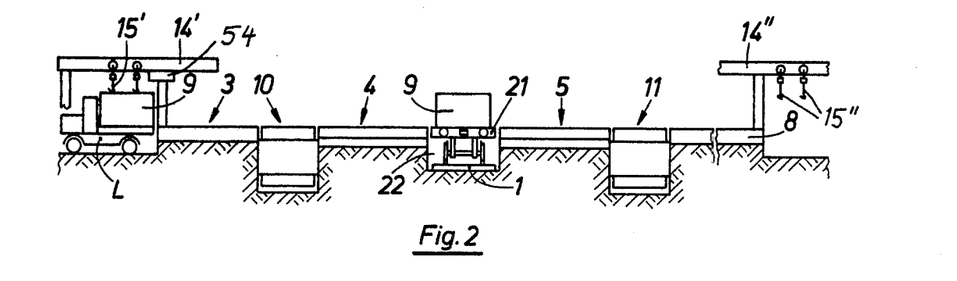
FIG. 2 is a cross-sectional view taken on the line II — II of FIG. 1.

As illustrated in FIG. 2 for the overhead transporters 14' and 14", these transporters comprise hooks 15, 15" suspended from horizontally displaceable chain blocks for hoisting a container 9 off a truck L and depositing it on the adjoining platform or vice versa. Unloading transporters 14' are provided with scales 54 which weigh the hoisted containers and signal that information to the computer for utilization in the calculation of the freight charge.

Figure 3:
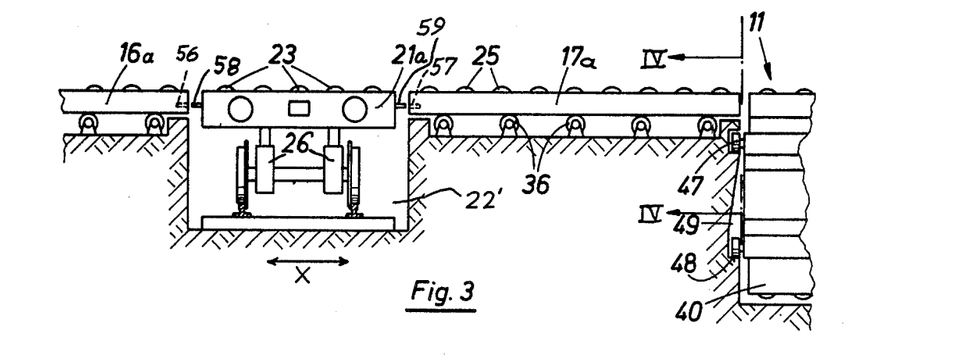
FIG. 3 is a fragmentary cross-sectional view showing part of the structure of FIG. 2 drawn to a larger scale.
Figure 4:
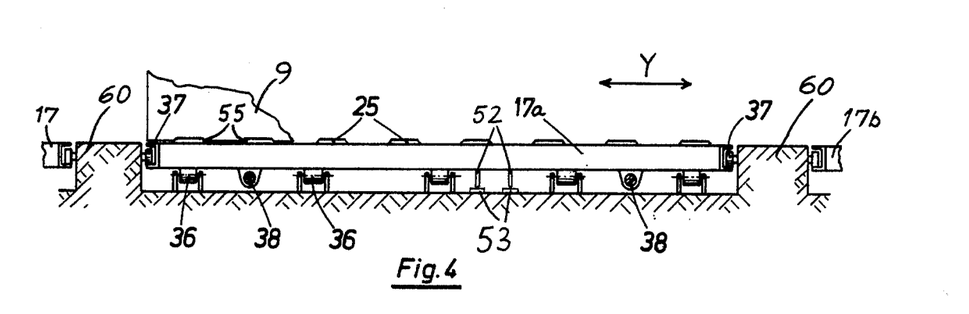
FIG. 4 is a fragmentary longitudinal sectional view taken on the line IV — IV of FIG. 3.

FIGS. 3 and 4 show the mobile platform sections 16a and 17a resting on supporting rollers 36 which facilitate their displacement toward flatcar 21a for loading and unloading, respectively, or for bridging the well 22' when the track is clear. Mating connectors 56, 57 (jacks) on the platforms and 58, 59 (plugs) on the flatcar enable the conveyor drives aboard the latter to be selectively energized, under the control of the computer, when one or the other platform section has moved close to the flatcar preparatorily to a container transfer. Pneumatic jacks 26 can be operated before the transfer to bring the rollers of conveyors 23 to the level of the platform-mounted conveyor rollers; this could be done automatically under the control of conventional level sensors such as photoelectric devices or emitters and receivers of laser beams. The immobilization of the flatcar body at the proper level during the transfer operation, like the locking of the conveyors 23 in transit, may also be accomplished fluidically, for example.

Figure 6:
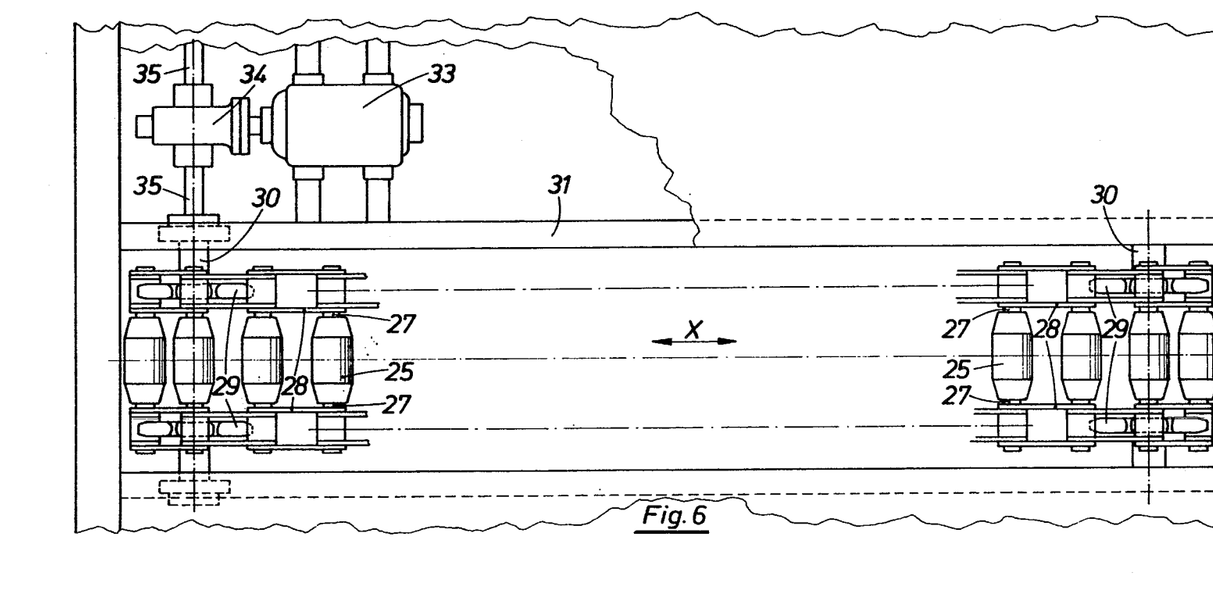
FIG. 6 is a fragmentary top view (with parts broken away) of the flatcar shown in FIG. 5.
Figure 7:
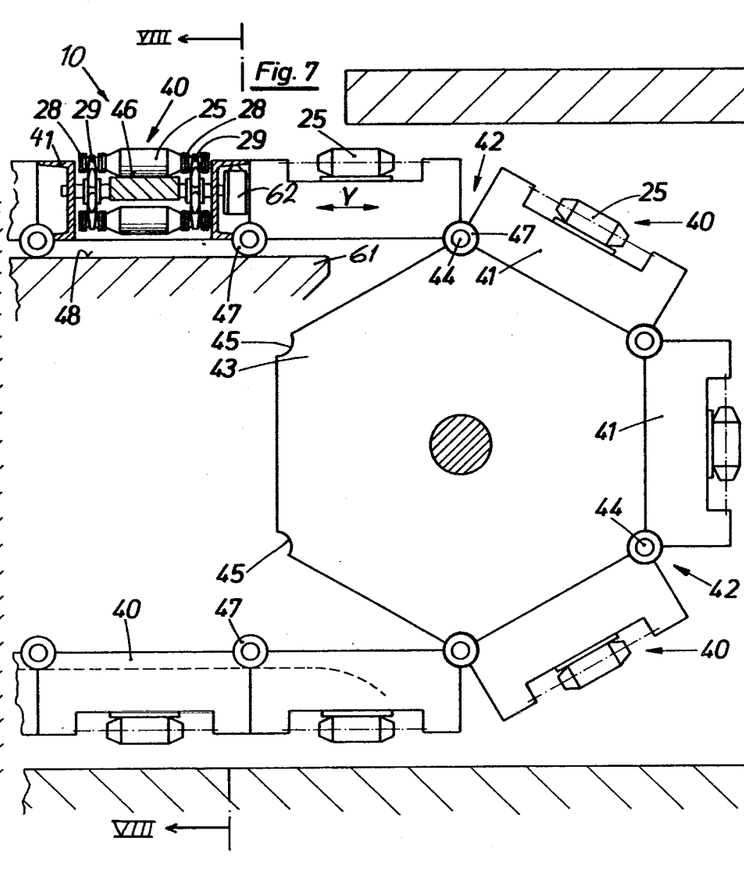
FIG. 7 is a fragmentary side-elevational view, partly in section, of a longitudinal conveyor included in the system of FIG. 1, drawn to larger scale.

As shown in FIG. 4, the containers 9 are provided on their undersurfaces with grooves 55 of trapezoidal profile complementary to that of the rollers 25 of conveyors 13, 23, 40 as best seen in FIGS. 6 and 7. Thus, each container is positively guided against lateral excursions (in the Y direction) while riding on any of the conveyors. FIG. 4 also illustrates two leadscrews 38, engaging respective nuts on the underside of a platform section, which are coupled with a reversible motor (not shown) for shifting that section in the X direction as described above. Contact brushes 52 sliding on fixed conductor 53 serve to energize the conveyor drives of each platform section. Counterrollers 37 on parting walls 60 keep these sections in contact with their supporting rollers 36.

Figure 5:
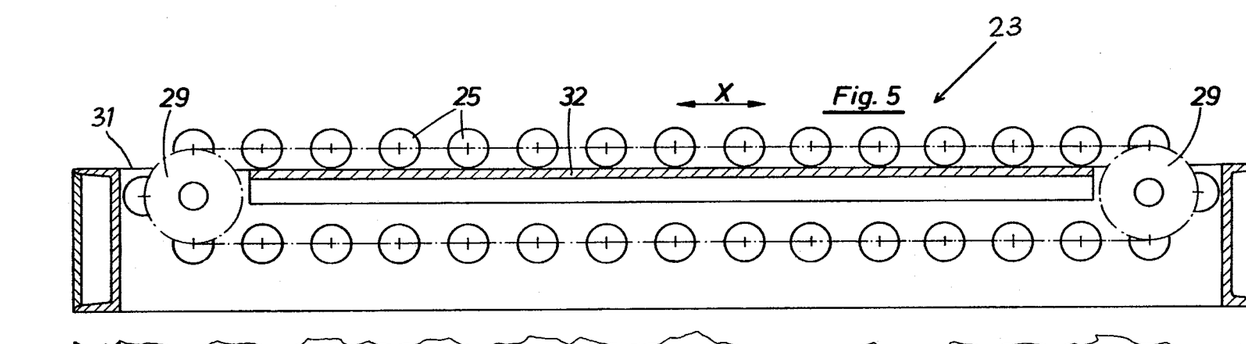
FIG. 5 is a cross-sectional view of the upper part of a flatcar equipped with a transverse conveyor in accordance with this invention.

FIGS. 5 and 6 show details of the construction of a cross-conveyor 23 which is also representative of that of a cross-conveyor 13. Each row of rollers 25 of this two-row conveyor is closed into a flat loop, the roller extremities 27 being interlinked to form two endless chains 28 carried on two pairs of sprockets 29 whose shafts 35 are journaled in bearings 30 lodged in sidewalls 31 of a surrounding frame structure. A reversible motor 33 common to the two roller loops of a conveyor drives the shafts synchronously through a bevel-gear coupling 34. A shelf 32 underlies the upper reach of the loop to support its rollers 25 which, when weighted down by a container resting thereon, frictionally engage the shelf 32 whereby the loop speed upon energization of motor 33 is translated into a peripheral roller speed substantially twice as high.

Figure 8:
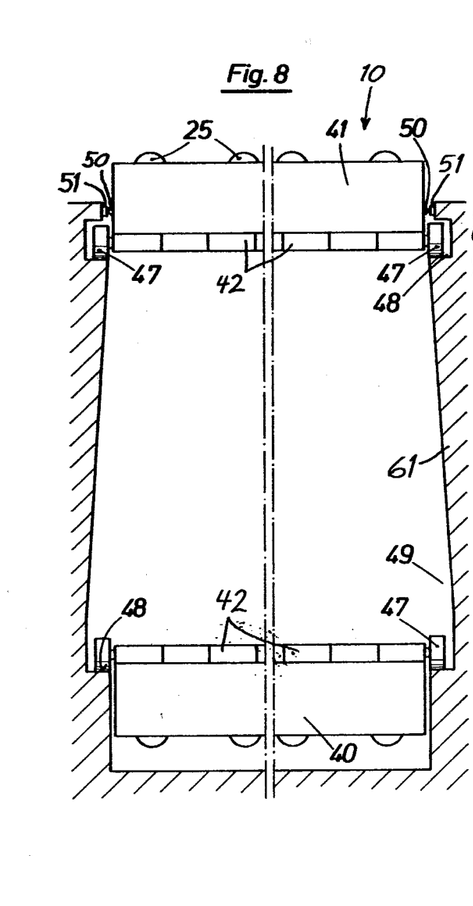
FIG. 8 is a cross-section view taken on the line VIII — VIII of FIG. 7.

Reference will now be made to FIGS. 7 and 8 for a description of the longitudinal conveyors (here specifically conveyor 10) and their cross-conveyors 40. The longitudinal conveyor consists, essentially, of an endless chain formed from prismatic links 41 which are articulated to one another by hinges 42 provided with pintles 44. The pintles carry wheels 47 riding, along the upper and lower runs of the chain, on lateral ledges 48 of a foundation 61 defining a channel 49 for the conveyor, this foundation supporting the adjoining platforms and forming the parting walls 60. Journaled in the channel walls are a pair of polygonal — here hexagonal — drums 43 (only one shown) having corner grooves 45 which matingly receive the hinges 42 whereby the chain is positively indexed with reference to the drums, each side of the polygon having the length of a link 41.

Each link 41 comprises a frame supporting sprockets 29 for chains 28 interlinking the extremities of feed rollers 25 which form a flat horizontal loop as described above for conveyor 23, one of the sprocket pairs being driven by a motor 62 whose energizing circuit includes coacting contact springs 50 on the respective link and 51 on foundation 61 engaging each other while the link rests on the upper chain run in line with respective halves of adjoining conveyors 13. A shelf 46 forms a support for the rollers 25 on the upper reach of the loop. Since each link carries only one roller loop, two links together support the rollers of a single conveyor 40; the corresponding motors 62 are energized simultaneously via contacts 50, 51.

Figure 9:
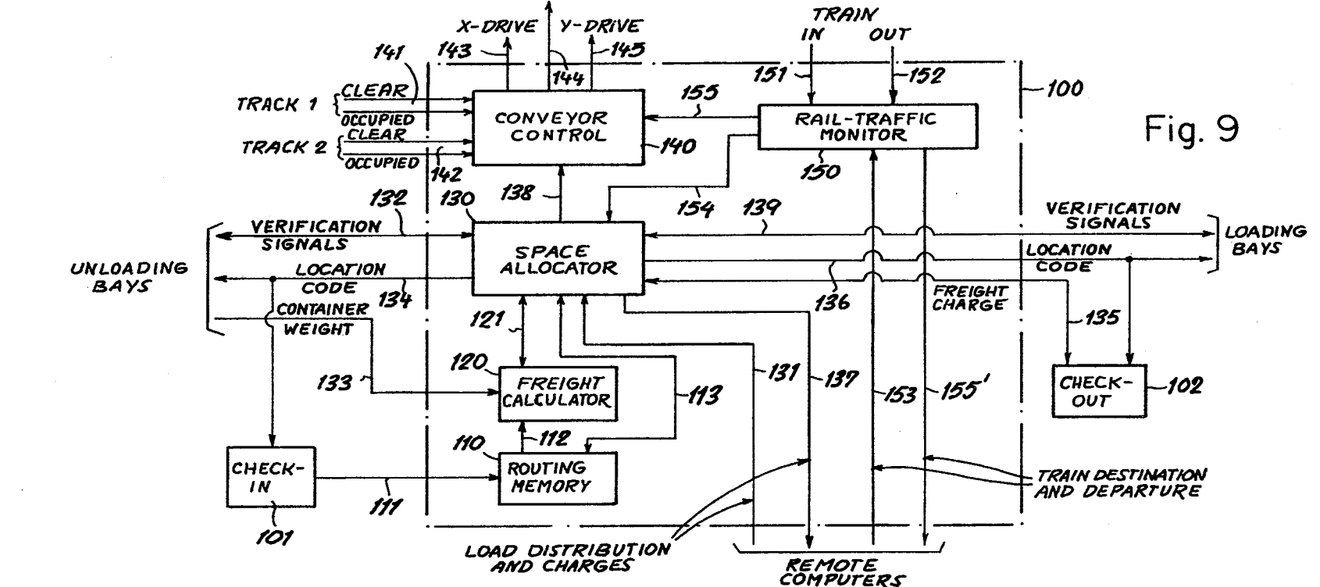
FIG. 9 is a block diagram of a computer serving the station shown in FIG. 1.

The computer 100 shown in FIG. 9 comprises a routing memory 110, a freight calculator 120, a space allocator 130, a conveyor-control unit 140 an a rail-traffic monitor 150. A check-in post 101 supplies container and destination codes, as read from a punch card containing also the sender and addressee information of ordinary bills of lading, via a line 111 to memory 110 which feeds that information to freight calculator 120 by way of a line 112. Memory 110, on the basis of the data stored therein, preselects a train heading for the desired destination — or for a junction point from which the same can be reached — and delivers the corresponding code over a line 113 to space allocator 130 which also receives from a remote computer, upstream along the route of the preselected train, via a line 131 a set of signals indicative of the load distribution on that train and the applicable charges. If that load distribution indicates the availability of space on the train, allocator 130 so informs the calculator 120 by way of a lead 121 and also reads out the code of an assigned location, i.e. the number of an unloading bay corresponding to an allocated unit area, on a line 134 which extends both to that bay and to the post 101. If no vacancies exist on the train first selected, the memory 110 learns of this condition via line 113 and thereupon makes a second choice, and so on.

Thus, when space is found to be available, a shipper communicating with post 101 in person or by telephone learns when and where to unload a container to be sent out. Upon arriving at the marked unloading bay, the driver backs up his truck L (FIG. 2) against platform 3 and transmits the container code, e.g. by means of a keyboard, over a low-voltage verification line 132 to allocator 130. If that code matches the one to which this bay has been temporarily assigned, and if the train with the allocated unit area is about due as determined by a departure signal transmitted to traffic monitor 150 from the upstream station over a line 153 and retransmitted to space allocator 130 through a connection 154, allocator 130 signals back to the unloading bay (e.g. turns on a green light) to let the operator hitch the container 9 to the hoist 15'. The operator closes a switch which starts the transporter 14', the horizontal transporter movement being halted by a limit switch when the container has reached the correct position above platform 3 whereupon it is lowered automatically onto the corresponding conveyor 13 and released from the hoist. The weight of the container, measured by scale 54, is communicated via a line 133 to calculator 120 which now has all the information needed for determining the freight charge. In principle, the operator may be required to pay all or part of this charge at that time before the computer 100 takes over the further handling of the container; in the case here contemplated, however, it is assumed that the freight is paid by the recipient.

Allocator 130, upon being informed via line 132 that the container has been placed on the first conveyor 13 of its assigned transfer path, transmits the relevant data over a line 138 to control unit 140 which not starts the drive in direction X by energizing the motors of the corresponding cross-conveyors via a set of conductors represented schematically by a line 143. Unit 140 has input leads 141 and 142 informing it of the clear or occupied states of tracks 1 and 2, e.g. as determined by photoelectric sensors. If the train is already in the station and has been correctly positioned as described above, a signal on a lead 151 triggers the monitor 150 into emitting over a lead 155 a pulse causing the unit 140 to energize the drive for the shifting of the corresponding section of platform 4 towards the train as soon as the container had landed on that section; this takes place over a set of leads 144. Unit 140 now also controls the operation of the corresponding conveyor 40 aboard the associated flatcar to complete the loading thereof. All the containers to be shipped from this station can thus be placed simultaneously on the flatcars. Containers to be unloaded from the train at this stop are being removed from the flatcars even as the new loads are taken on; this removal is carried out under the control of unit 140 in response to routing information received by allocator 130 from upstream stations. Thus the unloading operations also take place simultaneously for the entire train. In this way, a freight train with 40 or more cars need not remain in a station more than, say, 5 to 10 minutes. In fact, with a transfer speed of half a meter per second in the X direction the loading and unloading of the flatcars may be completed in less than 15 seconds. The movement of a container in the X direction to or from a bay or a longitudinal conveyor generally will take less than one minute.

When the engineer signals the impending departure of the train to monitor 150 over a lead 152, control unit 140 is activated to withdraw the shiftable platform sections from the immediate vicinity of the flatcars whereby the operating circuit for the trainborne conveyors 23 is broken. These conveyors are now locked and the departure of the properly identified train along with its load distribution and the relevant charges is communicated to the computer of the next downstream station by way of the signal lines 155' and 137 emanating from monitor 150 and allocator 130, respectively. It is only now that unit 140 energizes a set of leads 145 to bring any containers left over, namely those not yet called for and those which are to await a subsequent train, to the aforedescribed storage areas or to new trackside locations. Thus, a container sitting on platform section 17b and destined for a more forward space on a train due to arrive or already halting on track 2 may be returned across track 1 to conveyor 10 for displacement in the corresponding direction Y (upward in FIG. 1 if the second train moves in the same direction as the first) and then advanced again, in direction X, onto platform 6; another container on the same platform section 17b, to be placed on a flatcar aligned with section 17a, can be moved in the opposite direction Y (i.e. downward) by conveyor 11 and thereafter advanced in direction X across platform 18a.

An arriving train, of course, will not be allowed to enter the station as long as the well or pit of the track is bridged by a mobile platform section.

A check-out post 102 shown in FIG. 9 receives the codes of arriving containers together with the corresponding charge information over a line 135 from allocator 130 and informs that allocator over the same line that the charge has been paid. The allocator now emits over a line 136 the code of a loading bay to which the incoming container is being delivered for pick-up by a waiting truck, again with exchange of verification signals by way of a line 139 between the computer and the truck operator. If the recipient, notified in advance by the personnel of post 102, has not appeared or has failed to pay the freight, the container is shunted to a storage area at one of the platform extensions such as sections 16 – 19. Thereafter, when the operator of a pick-up truck comes in an pays the freight together with the penalty imposed for storage, he will be directed to one of the bays served by transporters 14 adjacent platform sections 17 and 18 to retrieve his cargo.

With an effective conveyor speed of one meter per second in the Y direction, the repositioning of containers earmarked for a change of trains may be terminated in about 8 to 10 minutes. This repositioning is controlled arithmetically by the computer, on the basis of the location codes for the assigned spaces on the first and second trains, whereas all the other conveyor motions are initiated by the computer but terminated by limit switches.

The transporters 14 near terminal platform sections 17 and 18, extending in the Y direction, each partly overlie two cross-conveyors 13 and can thus also be used for the unloading and loading of oversize cargo, such as a container 99 occupying two unit areas A. The conveyors of these terminal sections could further be utilized to provide a circuitous path from an unloading bay to the track 2, for example, in the event of a train stalled on track 1.

Following are some of the advantages realized with my improved freight-transportation system:

(a) Significant increase in the circulation rate of the flatcars, due to the reduction of the stopping time of a freight train to approximately that of a passenger train of equivalent capacity. This results in an increase in efficiency by about a factor of 7 as compared with conventional systems.

(b) More rapid delivery. With a rail network comparable to that of existing intercity transport, a suitable geographic distribution of about 40 transfer stations co-operating with local truck traffic would permit 24-hour deliveries between any two points in a territory the size of the German Federal Republic.

(c) Elimination of yard switching. The standardized containers or pallets can be moved over straight-line transfer paths while the train is stationary.

(d) Substantial reduction in transportation accidents.

(e) Significant economies in railroad personnel.

(f) Savings in comparison with conventional switching stations:
area requirement: about 1 : 40
monetary investment: about 1 : 12
operating cost: about 1 : 20

(g) Economies in fuel, especially diesel oil. A freight train carrying e.g. 160 containers requires considerably less energy than do 160 trucks. The potential relocation of long-range freight forwarding from the road to the rail would save about 3,600,000 tons of diesel oil in an economy such as that of the German Federal Republic.

Figure 10:
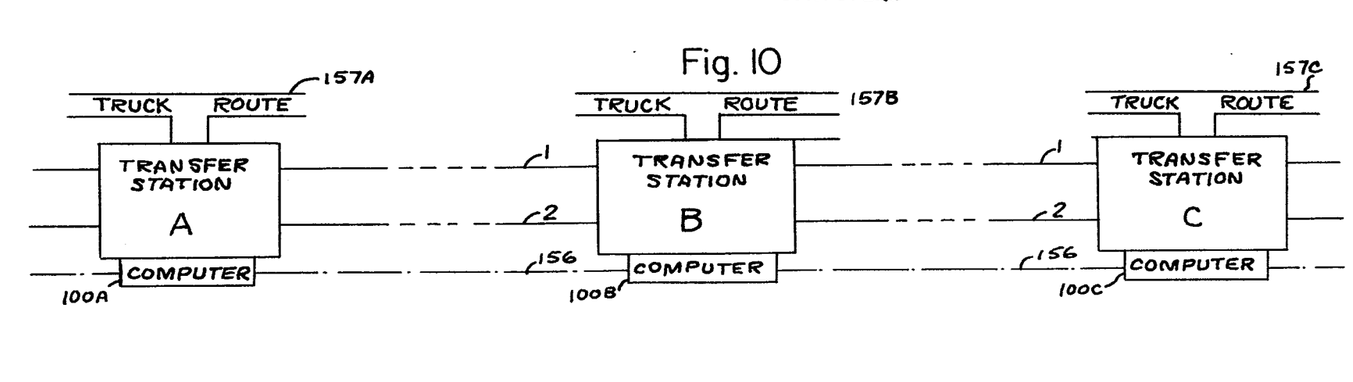
FIG. 10 shows a group of transfer stations forming part of the system.

In FIG. 10 I have illustrated several transfer stations A, B and C, each similar to the one shown in FIGS. 1 - 9, interconnected by tracks 1, 2 as well as by a line 156 linking their computers 100A, 100B, 100C with one another as described above. The stations are accessible to local roads 157A, 157B, 157C serving as truck routes.

I claim:

1. A freight-transportation system serving a given territory, comprising:

a rail network having a multiplicity of transfer stations each forming a junction between at least one railroad track and a local road;

loading and unloading bays at said stations accommodating road vehicles adapted to carry modular loads of predetermined dimensions;

conveyor means at each of said stations for transferring loads between said bays and respective spaces on flatcars of trains halting at said stations; and a computer at each of said stations controlling the operation of said conveyor means thereof in response to destination and available-space information fed in, the computers of adjacent stations being interconnected for exchanging said information;

said conveyor means forming a multiplicity of straight-line transfer paths extending each between a respective bay and an assigned unit area on any of said trains halting in a predetermined position on said track, each of said transfer paths including a set of rollers arrayed in at least one row transverse to said track and drive means controlled by said computer for displacing said rollers to advance a load resting thereon, said track being disposed in a well flanked by at least two raised platforms in line with load-carrying surfaces of said flatcars, said platforms being each traversed by a multiplicity of said transfer paths, said flatcars being provided with rows of further rollers forming extensions of said transfer paths in said predetermined position, the platforms proximal to said track being longitudinally divided into sections each substantially coextensive in length with a flatcar of any of said trains, each of said sections being individually transversely shiftable toward an aligned stationary flatcar of any of said trains and being further shiftable across said well in the absence of a train on said track.

2. A system as defined in claim 1 wherein the computer of each station further includes a routing memory for the storage of train schedules and station codes, said routing memory being addressable by locally generated load-identifying and destination signals for preselecting a train due to arrive at the corresponding station, and space-allocating means responsive to available-space signals from computers of stations upstream along the route of the preselected train for assigning a specific unit area of a flatcar thereof to a load identified by said locally generated load-identifying and destination signals.

3. A system as defined in claim 2 wherein the computer of each station further includes traffic-monitoring means responsive to locally generated arrival signals for activating said control means and to departure signals from computers of upstream stations to activate said space-allocating means, said traffic-monitoring means communicating with computers of other stations for passing on locally generated departure signals of trains headed for such other stations.

4. A system as defined in claim 3 wherein said computer further includes freight-calculating means controlled by said routing memory for indicating the charges for the transport of the load to the desired destination.

5. A system as defined in claim 4 wherein said loading bays are provided with weighing means for informing said freight-calculating means of the weight of the load.

6. A system as defined in claim 5 wherein said bays are provided with overhead transporters for lifting loads from said road vehicles, said weighing means forming part of said transporters.

7. A system as defined in claim 6 wherein said transporters are provided with loading and unloading means electrically connected to said computer.

8. A system as defined in claim 1 wherein said computer is provided with conveyor-control means responsive to a signal from any of said loading bays, indicative of the presence or absence of a pick-up vehicle thereat, for selecting a path to be taken by an incoming load discharged from any of said flatcars at the station, further comprising signaling means indicative of the payment of a freight charge by a recipient for enabling said conveyor-control means to direct an incoming load to a specific loading bay.

9. A system as defined in claim 1 wherein said track is provided with a normally withdrawn bumper block positionable behind any of said trains arrived at the station for engagement with the last car thereof to establish said predetermined position.

10. A system as defined in claim 1 wherein said sections and said flatcars are provided with coacting contacts for establishing a computer-controlled drive circuit for said further rollers upon close approach of a platform section to said aligned flatcar.

11. A system as defined in claim 1 wherein said flatcars are provided with lifting means for adjusting said load-carrying surfaces to the level of said platforms.

12. A freight-transportation system serving a given territory, comprising:
a rail network having a multiplicity of transfer stations each forming a junction between at least one railroad track and a local road;
loading and unloading bays at said stations accommodating road vehicles adapted to carry modular loads of predetermined dimensions;
conveyor means at each of said stations for transferring loads between said bays and respective spaces on flatcars of trains halting at said stations; and
a computer at each of said stations controlling the operation of said conveyor means thereof in response to destination and available-space information fed in, the computers of adjacent stations being interconnected for exchanging said information;
said conveyor means forming a multiplicity of straight-line transfer paths extending each between a respective bay and an assigned unit area on any of said trains halting in a predetermined position on said track, each of said transfer paths including a set of rollers arrayed in at least one row transverse to said track and drive means controlled by said computer for displacing said rollers to advance a load resting thereon, said track being disposed in a well flanked by at least two raised platforms in line with load-carrying surfaces of said flatcars, said platforms being each traversed by a multiplicity of said transfer paths, said flatcars being provided with rows of further rollers forming extensions of said transfer paths in said predetermined position, the platforms proximal to said track being longitudinally divided into sections each substantially coextensive in length with a flatcar of any of said trains, each of said sections being individually transversely shiftable toward an aligned stationary flatcar of any of said trains, said conveyor means further including at least one longitudinal conveyor parallel to said track and separated therefrom by one of said platforms.

13. A system as defined in claim 12 wherein said longitudinal conveyor comprises an endless chain with articulated links each with a length spanning a whole number of rows of said rollers and a width accommodating at least one modular load, said rollers being partly disposed on said links and forming at least one transverse row on each link alignable with a respective row of said rollers on the adjoining platform, said longitudinal conveyor being provided with intermittently operable drive means arresting said links in positions of alignment of said rows of rollers, the row of rollers on each link being provided with individual drive means.

14. A system as defined inn claim 13 wherein said chain is supported by a pair of polygonal drums provided with corner grooves, said links being interconnected by hinges receivable in said corner grooves for positively indexing said chain with reference to said drums.

15. A system as defined in claim 14 wherein said hinges have pintles provided with wheels, said chain being received in a channel of a platform-supporting foundation forming horizontal ledges engaged by said wheels on an upper and a lower run of the chain.

16. A system as defined in claim 15 wherein said foundation and said links are provided with coacting connectors for energizing the drive means of the rollers on said links.

17. A system as defined in claim 13 wherein the rollers of each of said rows are provided with sprockets supported on lateral mountings, said rollers being arrayed in a flat loop between said mountings and having extremities interconnected in a pair of endless chains engaged by said sprockets, said drive means being coupled with said sprockets.

18. A system as defined in claim 17 wherein said drive means comprises a motor common to a pair of adjacent roller loops forming part of a transverse conveyor on each of said platforms and on each of said flatcars.

19. A system as defined in claim 18 wherein said platform sections are provided with contact brushes engaging stationary transverse conductors for energizing the motors of said roller loops.

20. A system as defined in claim 17, further comprising a shelf secured to said mountings within said loop and supporting the rollers thereof on an upper reach of the loop.

21. A system as defined in claim 13 wherein the width of said platforms is a multiple of that of said links.

22. A system as defined in claim 13 wherein said rollers have an angular profile and are positively engageable in complementarily profiled grooves on the undersides of the modular loads.

23. A system as defined in claim 12 with two parallel tracks at any of said stations, a central longitudinal conveyor between said tracks and two outer longitudinal conveyors alongside said tracks, said platforms including two outer platforms between said bays and said outer conveyors, two intermediate platforms between said outer conveyors and said tracks, and two inner platforms between said tracks and said central conveyor.

24. A system as defined in claim 23 wherein said platforms have longitudinal extensions beyond said bays forming interim-storage facilities for waiting loads.

25. A freight-transportation system serving a given territory, comprising:
a rail network having a multiplicity of transfer stations each forming a junction between at least one railroad track and a local road;
loading and unloading bays at said stations accommodating road vehicles adapted to carry modular loads of predetermined dimensions;
conveyor means at each of said stations for transferring loads between said bays and respective spaces on flatcars of trains halting at said stations;
a computer at each of said stations controlling the operation of said conveyor means thereof in response to destination and available-space information fed in, the computers of adjacent stations being interconnected for exchanging said information;
said conveyor means forming a multiplicity of straight-line transfer paths extending each between a respective bay and an assigned unit area on any of said trains halting in a predetermined position on said track, each of said transfer paths including a set of rollers arrayed in at least one row transverse to said track and drive means controlled by said computer for displacing said rollers to advance a load resting thereon, said track being disposed in a well flanked by at least two raised platforms in line with load-carrying surfaces of said flatcars, said platforms being each traversed by a multiplicity of said transfer paths, said flatcars being provided with rows of further rollers forming extensions of said transfer paths in said predetermined position, the platforms proximal to said track being longitudinally divided into sections each substantially coextensive in length with a flatcar of any of said trains, each of said sections being individually transversely shiftable toward an aligned stationary flatcar of any of said trains; and an array of supporting rollers disposed underneath each of said sections for facilitating the transverse shifting thereof.

26. A system as defined in claim 25 wherein said platform sections are provided with nuts engaged by leadscrews for shifting same.

* * * * *